United States Patent

Girard

(10) Patent No.: US 6,657,843 B1
(45) Date of Patent: Dec. 2, 2003

(54) LIGHTNING ARRESTOR DEVICE FOR HIGH POWER ELECTRIC INSTALLATIONS

(76) Inventor: François Girard, 29, Rue Eugène Bussière, Dijon (FR), 21000

( * ) Notice: Subject to any disclaimer, the term of this patent is extended or adjusted under 35 U.S.C. 154(b) by 0 days.

(21) Appl. No.: 09/913,186
(22) PCT Filed: Feb. 9, 2000
(86) PCT No.: PCT/FR00/00307
§ 371 (c)(1),
(2), (4) Date: Aug. 9, 2001
(87) PCT Pub. No.: WO00/48285
PCT Pub. Date: Aug. 17, 2000

(30) Foreign Application Priority Data

Feb. 9, 1999 (FR) ............................................ 99 01503

(51) Int. Cl.[7] .............................. H01C 7/12; H02H 3/20
(52) U.S. Cl. ...................... 361/118; 361/56; 361/91.1; 361/111
(58) Field of Search ........................... 361/56, 90, 100, 361/104, 39, 40, 41, 118, 117, 111

(56) References Cited

U.S. PATENT DOCUMENTS

| 4,288,833 A |   | 9/1981 | Howell ........................ 361/124 |
| 4,922,366 A | * | 5/1990 | Van Dick .................... 361/104 |
| 6,282,073 B1 | * | 8/2001 | Glaser et al. ................ 361/104 |

FOREIGN PATENT DOCUMENTS

DE          41 24 321          1/1993

* cited by examiner

*Primary Examiner*—Jessica Han
(74) *Attorney, Agent, or Firm*—Young & Thompson

(57) ABSTRACT

A lightning arrestor device for protecting an installation (3) powered by an electric transmission line (1) includes at least two assemblies connected in parallel between the line terminals, each including a disconnector (P, P') mounted in series with at least a voltage-dependent variable resistance component. The variable resistance component is a Zener diode, at least one assembly consisting of at least two Zener diodes ($Z_1$, $Z_2$) arranged in parallel.

7 Claims, 2 Drawing Sheets

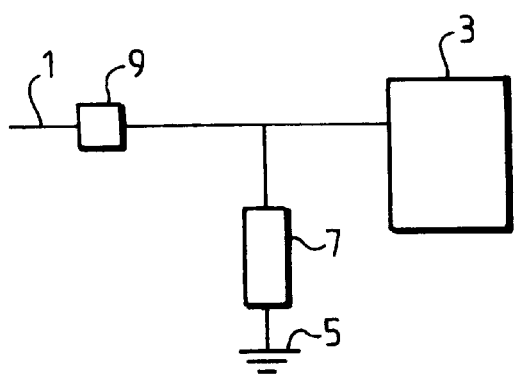
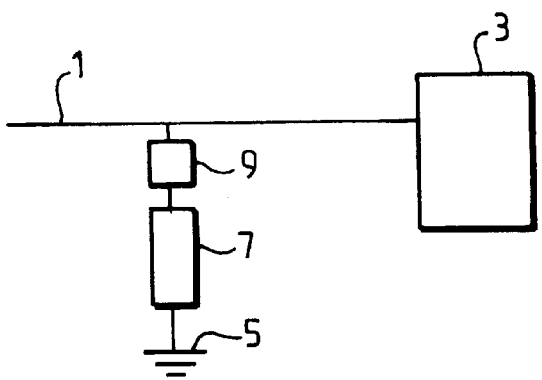
FIG.1  FIG.2
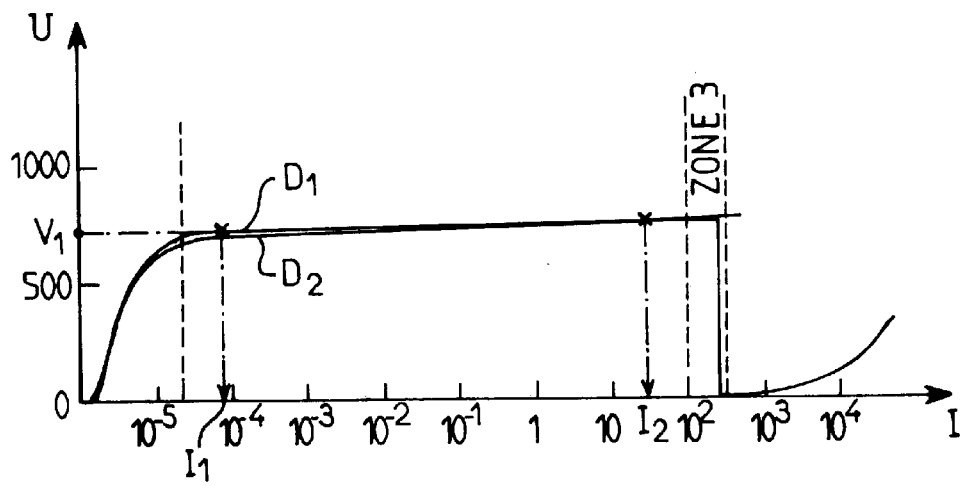
FIG.3
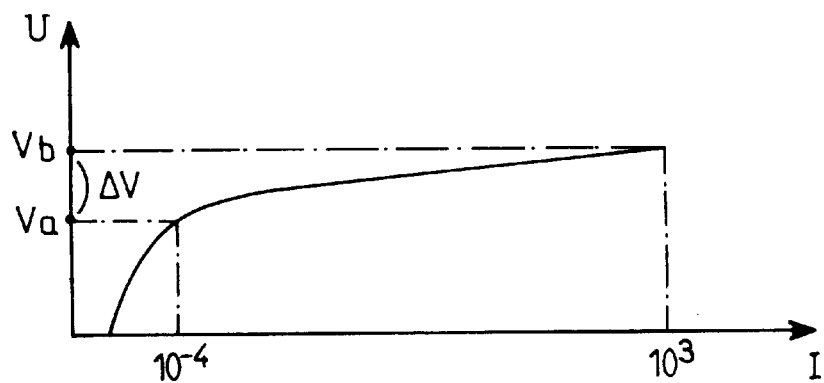
FIG.3a

LIGHTNING ARRESTOR DEVICE FOR HIGH POWER ELECTRIC INSTALLATIONS

BACKGROUND OF THE INVENTION

The present invention relates to a lightning arrestor device of the type used in particular for ensuring protection of high power electric installations.

DESCRIPTION OF THE RELATED ART

It is known that, in order to ensure protection of such installations against lightning, lightning arrestor devices are employed which are connected between a mains wire and earth, and which comprise components which, in normal functioning, behave like neutral elements but which, in the event of violent excess voltages, become conducting, so that they deviate the current due to the lightning towards earth, thus protecting the installation disposed downstream against the destructive effects of the excess voltage.

As a safety measure standard IEC 61643-1 renders it compulsory to associate with the lightning arrestor a disconnector whose role is to cut the circuit if the lightning arrestor is destroyed. Such disconnectors may be essentially disposed in two configurations.

In a first configuration, the disconnector is disposed, as shown in FIG. 1, on the line itself. Under these conditions, it will be understood that its disconnection brings about cut of electrical power of the installations located downstream.

In the second configuration, shown in FIG. 2, the disconnector is disposed on the by-pass branch going to earth, so that its disconnection indeed respects a continuity of service since the current can continue to circulate in the principal branch, but it no longer ensures a continuity of the protection since it interrupts the by-pass towards earth.

It will be understood that neither of these two configurations is totally satisfactory, since, after destruction of the lightning arrestor and the activation of the disconnector which is associated therewith, the first has the effect of paralyzing the installation and the second has the effect of placing the latter in danger.

It is also known that another quality of a lightning arrestor is its capacity to allow the excess voltages to pass without any wear occurring. This is why it appears advantageous to constitute such a lightning arrestor from elements which are particularly resistant to wear and tear such as semiconductor junctions of Zener type which, furthermore, present other qualities with respect to the other lightning arrestor devices of the prior state of the art, such as in particular dischargers and varistors.

DE-4124321-A describes a device for protection against excess voltages, comprising components with variable resistance as a function of the voltage, such as varistors, connected respectively in series with disconnectors, such as fuses, in at least two circuit branches extending in parallel between an electrical power line having to be protected against excess voltages and earth.

SUMMARY OF THE INVENTION

The present invention has for its object to overcome the drawbacks mentioned above by proposing means for protection against the effects of lightning which ensure, after a lightning stroke, both the continuity of service for the installation and its protection against a subsequent lightning stroke, and this with components of Zener type.

The present invention thus has for its object a lightning arrestor device for protecting an installation powered by an electric transmission line, consisting of at least two assemblies connected in parallel between the line terminals and each comprising a disconnector mounted in series with at least one voltage-dependent variable resistance component, characterized in that the variable resistance component is a Zener diode, at least one assembly consisting of at least two Zener diodes arranged in parallel.

According to the invention, the threshold voltages of the respective Zener type diodes of said assemblies will preferably be adjacent.

In an embodiment of the invention, one of the assemblies comprises a Zener type diode of which the threshold voltage is greater than that of the Zener diodes of the other assemblies.

The threshold voltage of said assembly is preferably greater than the threshold voltage of the other assembly by a value equal to substantially the voltage difference between the low current and high current values of the other assembly.

As will be set forth hereinbelow, such a differentiation of these diodes makes it possible to avoid, in cases of very particular characteristics of excess voltages due to lightning, that the two Zener diodes simultaneously become conducting and be destroyed, in that case leaving the installation bereft of protection.

In order to make a selection, it is also possible to give one of the assemblies short links and the other assembly long links.

In a preferred embodiment of the invention, at least one of the assemblies constituted by at least two Zener diodes in parallel presents electrical links between these diodes and the installation which are shorter links than those of the other assemblies.

BRIEF DESCRIPTION OF THE DRAWINGS

A form of embodiment of the present invention will be described hereinafter by way of non-limiting example, with reference to the accompanying drawing, in which:

FIG. 1 schematically shows a protection assembly according to the prior state of the art in a configuration excluding a continuity of service.

FIG. 2 schematically shows a protection assembly according to the prior state of the art in a configuration excluding a continuity of service.

FIG. 3 is a graph representing the characteristic of a Zener diode of the type able to be used according to the present invention, namely the variation of the voltage as a function of the intensity thereof.

FIG. 3a is a schematic graph of the characteristic of a Zener diode, intended to demonstrate the voltage difference $\Delta V$ at the terminal thereof, in the case of weak currents and of strong currents.

DESCRIPTION OF THE PREFERRED EMBODIMENTS

Figure 4:
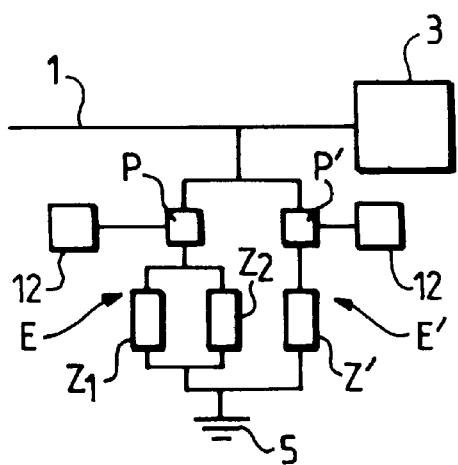
FIG. 4 is a schematic view of an example of an assembly according to the invention for protection against lightning.

FIG. 1 shows a line 1 for electrical supply of an installation 3 which it is desired to protect against the destructive effects of lightning. To that end, according to the prior state of the art, a lightning arrestor 7 has been arranged between the line 1 and earth 5, i.e. a device, which, in normal functioning, behaves like a neutral element, i.e. it does not conduct current, but which, in the event of a violent excess voltage, becomes conducting. In a first configuration of protection shown in FIG. 1, there is disposed on the line 1 upstream of the lightning arrestor 7 a disconnector device 9, i.e. a device which has the effect of opening the circuit when it is traversed by a considerable current. In such an embodiment, when an excess voltage, too violent due to the lightning, occurs, causing the lightning arrestor to melt, the latter short-circuits and diverts the current towards earth 5, thus protecting the installation 3. During this action, the disconnector 9 opens, thus depriving the installation 3 of any electrical supply.

In the second configuration according to the prior state of the art shown in FIG. 2, the disconnector 9 is placed on the branch conduit upstream of the lightning arrestor 7. Under these conditions, when a considerable excess voltage provoked by lightning occurs, the lightning arrestor 7 passes to the state of short circuit, thus diverting the excess voltage towards earth 5, then the disconnector 9 opens the circuit. Under these conditions, if the installation 3 remains supplied with current after the effect of lightning, it is then noted that it is no longer protected against a subsequent effect, insofar as the disconnector 9 has opened the branch conduit.

The basic principle of the lightning arrestor device according to the present invention consists in exploiting an observation made by Applicant whereby, in dynamics, the residual voltage of a Zener diode varies considerably as a function of the variation of the current di/dt.

Figure 5:
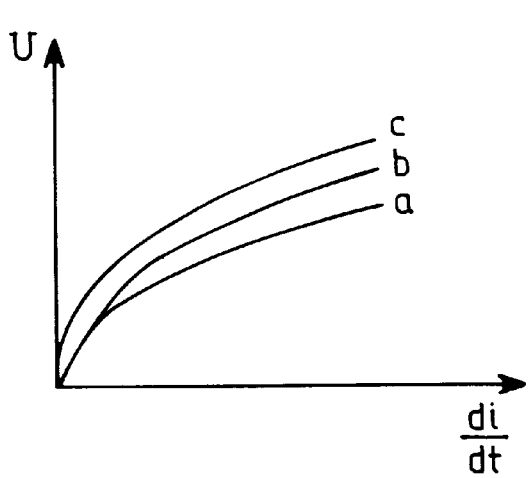
FIG. 5 is a graph representing the variation of the voltage V as a function of the variation of instantaneous current di/dt respectively for two Zener diodes in parallel of adjacent threshold voltages, for a Zener diode alone of the same threshold voltage, and for a Zener diode of slightly greater threshold voltage.

In effect, if two Zener diodes whose threshold voltage is very close, are associated in parallel, with the aid of short connections, and if there is plotted on a diagram the variation of the voltage at their terminals as a function of the instantaneous variation of the intensity di/dt (curve a), it is ascertained that the course of the curves is such as shown in FIG. 5. The same has been done with one only of the two Zener diodes, for example the diode, and the corresponding values are plotted on the same FIG. 5 (curve b).

It is noted in this Figure that the characteristic curve of the two Zeners mounted in parallel lies beneath the corresponding curve relative to a single Zener diode.

Furthermore, the same Figure shows a third curve (curve c) relative to a third Zener diode, of which the threshold voltage is slightly greater than the threshold voltage of the preceding two Zener diodes, preferably by a value $\Delta V$ equal to the voltage difference existing between the low current value Va and the high current value Vb of this Zener diode (FIG. 3a).

The curves obtained show that the association of the two Zener diodes facilitates the insulation of a Zener group, and the selection or differentiation in the event of a considerable excess voltage of this particular group.

It is known that the placing in parallel of semiconductor junctions of Zener type raises problems by reason of the course of the characteristic curve of the Voltage/Current function f(U/I), of which an example is reproduced in FIG. 3.

In effect, although the voltage is the same at the terminals of two Zener diodes disposed in parallel, it is observed, due to the slight inclination of the curve f(U/I), that the currents which traverse said diodes may nonetheless be very different. In this way, on the curve shown in FIG. 3, it is ascertained that, for the same voltage $V_1$, the respective currents traversing Zener diodes $D_1$ and $D_2$ of which the threshold voltages are adjacent, are traversed by respective currents $I_1$ and $I_2$ of very different intensities. Under these conditions, it will be understood that it will be necessary to match them by a strict sorting from their threshold voltage, if it is desired that they distribute the discharge current equitably.

According to the invention, as shown in FIG. 4, a module has been produced, formed by two assemblies E, E' constituted by Zener diodes $Z_1$ and $Z_2$ respectively for assembly E and Z' for assembly E', which have been chosen by sorting so that their threshold voltages are adjacent, with which two respective disconnectors P, P' have been placed in series, so that the two inputs of these disconnectors P, P', are joined by a short electrical connection 10 which is joined to the line 1, in the same way as their respective outputs are also joined, by a short electrical connection 10', itself connected to earth 5.

Under these conditions, it is understood that, when a considerable excess voltage due to lightning occurs, the group of two Zener diodes $Z_1$, $Z_2$ begins to conduct first, so that, at the end of life (melting provoking a conductivity) of one of the two, the latter short circuits all the others and it alone supports all the intensity of the current resulting from this considerable excess voltage. During the passage of this high intensity, the disconnector associated with the Zener diode rendered conducting is disconnected, in that case interrupting the passage therethough.

Under these conditions, it will be understood that the service procured by line 1 has not been interrupted by the considerable excess voltage traversing the lighting arrestor and that one of the two, namely the one which has not passed to the definitive state of conduction, remains operational.

In such an assembly, it is not possible to know that the disconnection has taken place. To know this, it is, of course, possible to add to the disconnector which has passed from the conducting state to the non-conducting state, annexed means 12 indicating that the lightning arrestor associated therewith is to be replaced.

A "led" diode may thus be associated with each assembly E, E', which lights up when the disconnector device 9 is disconnected.

However, it has been ascertained that, by reason of the particularly complex nature of the excess voltages due to the lightning, it may happen that two lightning arrestors in parallel conduct simultaneously and that, consequently, they are simultaneously destroyed, in that case leaving the installation without protection, the annexed means 12 indicating the disconnection.

According to the invention, means will therefore be proposed, enabling the two assemblies to be differentiated so that one certainly reacts before the other.

A first means will therefore consist in differentiating the respective threshold voltages of the assemblies E and E'. The threshold voltage of the assembly E' will preferably be higher than the threshold voltage of the other assembly E by a value $\Delta V$ equal to the voltage difference existing between the low current value $V_a$ and the high current value $V_b$ of the other assembly (FIG. 3a). This choice makes it possible to conserve a good level of protection at the second stage (namely the one of which the threshold is higher).

A second means for ensuring differentiation of the Zener diodes will consist in playing on the reaction times thereof by acting on the length of the links of these Zener diodes with the installation.

Figure 7:
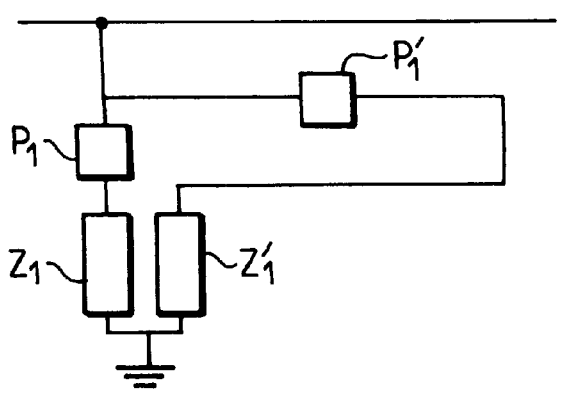

As shown in FIG. 7, a first assembly constituted by a Zener diode $Z_1$ and by a disconnector $P_1$ is connected to the installation by a short link, while a second assembly constituted by a Zener diode $Z'_1$ and by a disconnector $P'_1$ is connected to the installation by a long link.

In such a configuration, it has been ascertained that the assembly which was "activated" first by a considerable excess voltage due to the lightning was always the one with short link. An additional means is thus available for ensuring the differentiation of the activation of the two assemblies.

Figure 6:
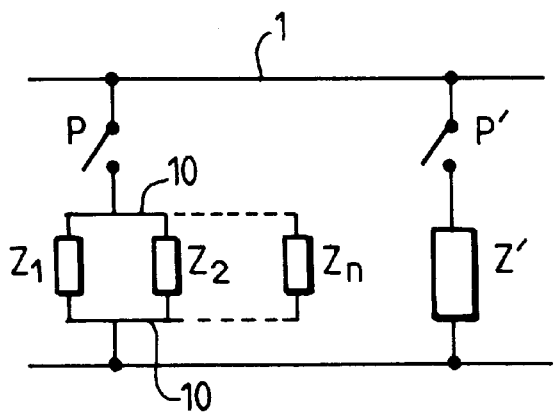
FIGS. 6 and 7 are schematic views of two examples of embodiment of an assembly according to the invention for protection against lightning.

It is, of course, possible according to the invention, as shown in FIG. 6, to constitute two assemblies E and E' of which one will comprise a number n of Zener diodes, $Z_1$, $Z_2$... $Z_n$.

The present form of embodiment of the invention is interesting in that it makes it possible to determine that of the two lightning arrestor assemblies which will certainly be activated in the event of an excess voltage provoked by lightning.

Although the present invention is usable and presents numerous applications in the field of direct current, it is, of course, also usable in the field of alternating current. In the latter case, it goes without saying that, instead of a single Zener diode, two Zener diodes mounted head to tail will be employed. In the present text, one Zener diode will therefore also designate two Zener diodes mounted head to tail when it will be question of circuits treating alternating current.

What is claimed is:

1. Lightning arrestor device for protecting an installation (3) powered by an electric transmission line (1), comprising at least two assemblies connected in parallel between line terminals and each assembly comprising a disconnector (P, P', $P_1$, $P'_1$) mounted in series with at least one voltage-dependent variable resistance component, characterized in that the variable resistance component is a Zener diode, at least one assembly comprising at least two Zener diodes ($Z_1$, $Z'_1$, $Z_2$) arranged in parallel.

2. Lightning arrestor device according to claim 1, characterized in that the at least one of the assembly comprising at least two Zener diodes arranged in parallel presents electrical links between these diodes and the installation which are short links.

3. Lightning arrestor device according to claim 1, characterized in that one of the assemblies comprises a Zener diode of which the threshold voltage is greater than that of the Zener diodes of the other assemblies.

4. Lightning arrestor device according to claim 3, characterized in that the threshold voltage of said assembly is greater than the threshold voltage of the other assembly by a value ($\Delta V$) equal to substantially the voltage difference between the low current value ($V_a$) and high current value ($V_b$) of the other assembly.

5. Device according to claim 1, characterized in that the threshold voltages of the respective Zener diodes ($Z_1$, $Z'_1$) of said assemblies are approximately the same.

6. Lightning arrestor device according to claim 5, characterized in that one of the assemblies comprises a Zener diode of which the threshold voltage is greater than that of the Zener diodes of the other assemblies.

7. Lightning arrestor device according to claim 6, characterized in that the threshold voltage of said assembly is greater than the threshold voltage of the other assembly by a value ($\Delta V$) equal to substantially the voltage difference between the low current value ($V_a$) and high current value ($V_b$) of the other assembly.

* * * * *